Dec. 31, 1929.                R. C. BENNER ET AL                1,741,551
                    METHOD OF PRODUCING ELEMENTAL SULPHUR
                              Filed Jan. 21, 1927
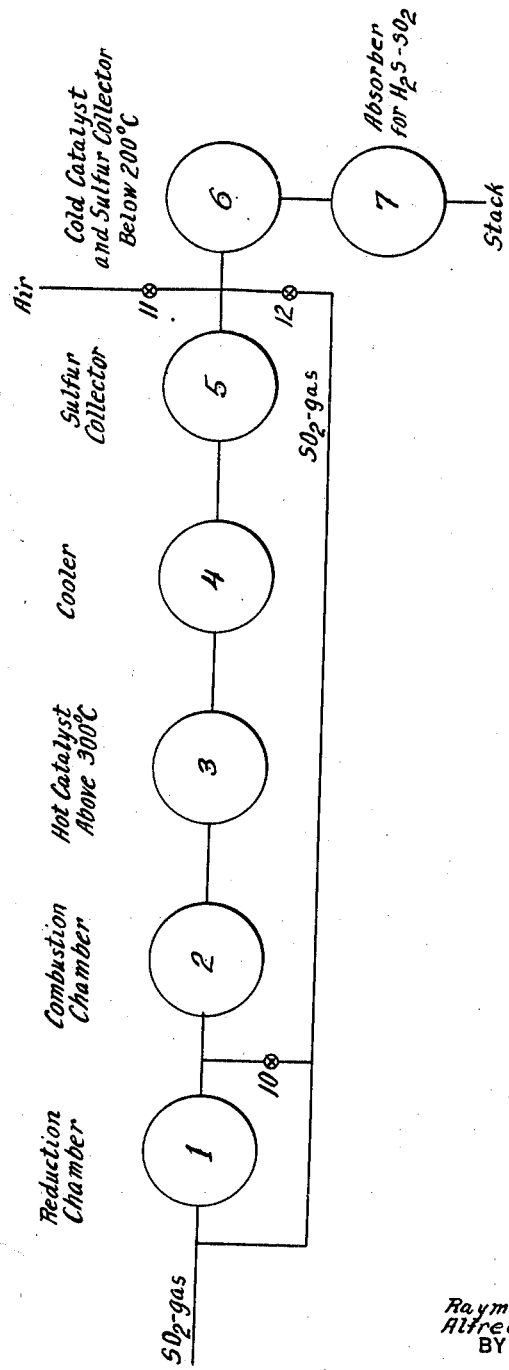
INVENTOR
Raymond C. Benner
Alfred Paul Thompson
BY Forbes Lilaby
ATTORNEY

UNITED STATES PATENT OFFICE

RAYMOND C. BENNER, OF NIAGARA FALLS, AND ALFRED PAUL THOMPSON, OF JACKSON HEIGHTS, NEW YORK, ASSIGNORS TO GENERAL CHEMICAL COMPANY, OF NEW YORK, N. Y., A CORPORATION OF NEW YORK

METHOD OF PRODUCING ELEMENTAL SULPHUR

Application filed January 21, 1927. Serial No. 162,570.

This invention relates to a method of producing elemental sulphur from gases containing sulphur compounds such as sulphur dioxide, hydrogen sulfide, carbonyl sulfide, etc., and particularly to a method of producing elemental sulphur from sulphur dioxide as it occurs in gases from roasting or smelting furnaces or the like.

It is the object of our invention to provide a process for the rapid and complete reduction of sulphur dioxide either in the pure state or in gas mixtures and the recovery of elemental sulphur, whereby substantially all the sulphur introduced into the system is recovered in the elemental form and the gas leaving the system contains practically no gaseous sulphur compounds which would reduce the efficiency of the process or create a nuisance.

In the processes heretofore known for the production of elemental sulphur from sulphur dioxide by reduction of the oxide with carbonaceous fuel or reducing gases such as water gas, producer gas, coal gas, hydrogen sulfide, etc., the operation of the processes required that a comparatively high temperature, namely 500–1000° C. be employed in order to obtain sufficiently rapid reaction. However, at such temperatures certain of the reducing reactions are far from complete. This is true, for example, where, as is ordinarily the case, there is a considerable amount of hydrogen sulfide or water vapor present in the reacting gases, since the reaction

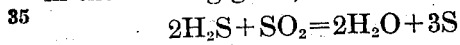

is reversible and incomplete at temperatures as low as 300° C. Because of the incompleteness of the reduction processes as heretofore carried out, the loss of sulphur in the form of unreduced sulphur dioxide, or in the form of hydrogen sulfide, has rendered the processes commercially inefficient. Furthermore, the discharge of these gases into the atmosphere from such systems creates a troublesome nuisance.

In the reduction of sulphur dioxide with carbonaceous reducing fuels, there is present in nearly all cases an appreciable amount of hydrogen, either as free hydrogen, or as combined hydrogen in the form of hydrocarbons, or as water vapor, etc. We have found that in the process of reduction at temperatures suitable for rapid reaction, i. e. 300° C. or above, a major portion of such hydrogen is converted into the form of hydrogen sulfide. Even when the reducing fuel contains substantially no hydrogen, considerable hydrogen sulfide will be produced from the moisture normally present in the sulphur dioxide gas or in the air admixed therewith. Furthermore, we have found that when reducing sulphur dioxide with carbonaceous fuels, there is a rapid and complete interaction of the sulphur dioxide with the carbon monoxide present at high temperatures, i. e. 300–700° C., and that such high temperature is extremely desirable because of the rapidity of the reduction. The interaction of the sulphur dioxide with the hydrogen sulfide produced from the hydrogen normally present in the reacting gases is, however, far from complete at such high temperatures, and we have discovered that such interaction can only be made substantially complete at comparatively low temperatures, that is, at such a temperature that the elemental sulphur formed has no appreciable vapor pressure. Likewise in the reduction of sulphur dioxide with hydrogen or hydrogen sulfide, while the interaction may be, and preferably is, initiated at comparatively high temperatures, i. e. above 300° C., because of the more rapid rate at such temperature, the reversible reaction between sulphur vapor and water vapor by which sulphur dioxide and hydrogen sulfide are reformed, is also rapid enough to prevent substantial completion of the reaction between hydrogen sulfide and sulphur dioxide, and such interaction can only be brought to substantial completion at a temperature at which the elemental sulphur formed has no appreciable vapor pressure. Applying these discoveries, we have provided a novel and efficient process for the reduction of sulphur dioxide to elemental sulphur.

Broadly, our invention consists in mixing the gas containing sulphur dioxide with a non-sulphurous and/or sulphurous reducing gas, or passing the sulphur dioxide through incandescent carbonaceous reducing material, or a mixture of carbonaceous reducing material and sulfide ore as set forth in our co-pending applications Serial No. 134,160, dated September 8, 1926, and Serial No. 134,161, dated September 8, 1926, and adjusting the composition of the resulting gas, if necessary, by the addition of sulphur dioxide containing gas to provide approximately interacting proportions of reducing and reducible gases, causing the interaction of such mixed gases while maintaining a temperature above that at which the elemental sulphur produced will be precipitated from the gas stream, i. e. above about 300° C., cooling the gas mixture, and subsequently passing the resulting gas mixture over a suitable catalyst to complete the interaction and to condense the remaining sulphur vapor while maintaining a temperature below that at which sulphur has an appreciable vapor pressure, i. e. below about 200° C.

The accompanying drawing illustrates diagrammatically the preferred system for carrying out our novel method, and reference will be made thereto in the following description.

The gas containing sulphur dioxide with or without other gaseous sulphur compounds, such as may occur in the exit of smelters, or obtained directly by the roasting of sulfide ores, is first contacted with a reducing agent. If the gas contains but a small amount of sulphur dioxide this sulphur dioxide may be concentrated by any of the well-known methods such as liquefaction and vaporization, absorption in oil or water, or in solid adsorbents such as alumina, dehydrated bauxite, or activated carbon, with subsequent liberation by heat, etc. In our preferred method the sulphur dioxide gas containing for example 7% sulphur dioxide, or concentrated as desired, is introduced into a reduction chamber 1 and pased upwardly through a bed of solid carbonaceous fuel which is maintained in an incandescent state. We may, however, contact the sulphur dioxide and carbonaceous fuel in the manner set forth in our co-pending application Serial No. 91,675 dated March 2, 1926. The solid fuel may be either bituminous or anthracite coal, or coke, etc. The gas mixture leaving the ruduction chamber will usually contain an excess of reducing gases such as hydrocarbons, carbon monoxide, hydrogen, hydrogen sulfide, etc., as well as a small amount of unreduced sulphur dioxide, some carbon oxysulfide, and considerable sulphur vapor. Accordingly we provide for the introduction of a further quantity of sulphur dioxide containing gas into the gas mixture, so that the amounts of reducing and reducible gases may be adjusted to provide approximately reacting proportions, or such that the amount of reducing gases is slightly in excess. This additional quantity of sulphur dioxide containing gas is by-passed around the reduction chamber and its admission controlled by a valve 10. When the gas mixture from the reduction chamber contains approximately interacting proportions of reducing and reducible gas, no by-pass of sulphur dioxide will be necessary.

The mixed gases are passed to a combustion chamber 2 where they interact with the evolution of a large amount of heat, the interaction of sulphur dioxide and carbon monoxide to yield carbon dioxide and sulphur being strongly exothermic.

The combustion chamber is provided with suitable firebrick checkerwork and with a layer of porous refractory material disposed transversely of the gas steam for filtering out any solid particles and for aiding the combustion. When the gas mixture coming from the reduction chamber is contaminated with soot or other solid carbonaceous matter we prefer to maintain the temperature of the combustion chamber at about 750° C. or above. Under this condition of operation the soot and solid carbonaceous matter will be filtered out by the refractory material and burned by the carbon dioxide and sulphur dioxide thereby freeing the gas from these solid impurities. As an example of suitable refractory material, we have found that dehydrated bauxite in granular or lump form is particularly effective in removing the soot and causing its combustion with carbon dioxide and sulphur dioxide. The temperature of the chamber is easily maintained by the sensible heat in the gases resulting from their passage through the reduction chamber and by the heat of reaction. When the gases from the reduction chamber are not contaminated with soot it will not be found necessary to maintain as high a temperature in the combustion chamber.

If desired, the gases from the reduction chamber may be subjected to any of the well-known mechanical means, such as a baffle chamber, to remove the soot, prior to the introduction of the by-passed sulphur dioxide.

The mixed gases from the combustion chamber contain any reducible and reducing gases which have not interacted, such as sulphur dioxide, carbon monoxide, hydrogen and hydrogen sulfide. These gases may be conducted directly to the cooler 4 but are preferably first conducted through a catalyst chamber 3, designated as the hot catalyst, to render the interaction as complete as possible. This is particularly desirable when a high temperature (i. e. 750° C. or above) is employed in the combustion chamber. The temperature of this chamber 3 is maintained above that at which the elemental sulphur formed will be retained by the catalyst, i. e.

above about 300° C., and preferably at about 350–450° C. in order to cause rapid interaction of any remaining reducing and reducible gases. Since the gases from the combustion chamber are normally considerably above this temperature it will be found desirable in many cases to remove the excess heat before the gases enter the catalyst chamber by suitable heat interchange devices, as for example a suitable type of waste heat boiler, the temperature of the gases leaving the heat interchanger being adjusted to the optimum value for introduction into the hot catalyst chamber.

Alternatively with the method of treating the sulphur dioxide gas with incandescent carbonaceous fuel, we may mix the gas directly with reducing gases. Such reducing gases may comprise coal gas, producer gas, water gas, hydrogen sulfide, etc. The reducing and reducible gases are mixed in approximately reacting proportions, or such that the amount of reducing gas is slightly in excess. The desired temperature for the introduction of the mixed gases into the catalyst chamber 3 may be obtained by preheating the gases, or burning a portion of the reducing gas with oxygen or air. Where the sulphur dioxide gas is taken directly from the smelting or roasting furnace, or where the heat of reaction is sufficient to maintain the desired temperature in the hot catalyst chamber 3, such heating will of course be unnecessary as the gas is already sufficiently hot.

The chamber 3 contains a suitable catalyst for the interaction of the sulphur dioxide with the reducing gases. We have discovered that bauxite, a natural mixture of hydrated alumina, iron oxide, titanium oxide, etc., exhibits a very great catalytic effect on the reaction and is therefore a preferred catalyst. Other catalytic material may however be employed, such as iron oxide, pyrites cinder, titanium oxide, aluminum oxide, calcium sulfate, calcium sulfide, etc. The temperature of the catalyst chamber 3 is readily maintained above about 300° C. and preferably about 350–450° C. by the sensible heat in the gases and by the heat of reaction of the reducing and reducible gases.

The reduction of the sulphur dioxide by the several reducing gases in the combustion chamber and in the catalyst chamber takes place according to the following typical equations:

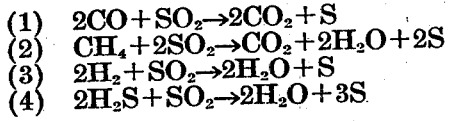

(1) $2CO + SO_2 \rightarrow 2CO_2 + S$
(2) $CH_4 + 2SO_2 \rightarrow CO_2 + 2H_2O + 2S$
(3) $2H_2 + SO_2 \rightarrow 2H_2O + S$
(4) $2H_2S + SO_2 \rightarrow 2H_2O + 3S$ Reaction (1) is rapid and complete at high temperatures but reactions (2), (3), and (4), while rapid at the elevated temperatures, are incomplete. Especially is this true of reaction (4) which reverses to a considerable extent at temperatures as low as 300° C. and to a considerably greater extent at the preferred temperature of operation, namely 350–450° C. Because of this fact, the gases leaving the hot catalyst chamber 3 may contain as much as 5–20% of the total sulphur gases in the system in the form of hydrogen sulfide, carbon oxysulfide, and sulphur dioxide, which have not interacted. To discharge these gases containing such quantities of sulphur gases into the atmosphere would create a troublesome nuisance and the accompanying loss of sulphur would reduce the efficiency of the process.

According to our invention therefore the gases are cooled by a suitable heat interchange device 4, as for example a waste heat boiler, whereby the elemental sulphur is condensed. The condensed sulphur may then be removed from the gases if desired, and collected by any preferred type of collector 5. The sulphur collector 5 may be of a mechanical type such as a baffle chamber with fixed or rotating baffles, or it may be of the electrostatic type whereby the condensed sulphur is electrostatically precipitated; or it may comprise a washer type whereby the condensed sulphur is dissolved as for example in oil, or washed out, as for example with water, or the sulphur may be adsorbed in a suitable adsorbent, as for example dehydrated bauxite. When employing a collector of the mechanical type liquid sulphur may be continuously withdrawn from the collector by maintaining the temperature of the collector at about 125–200° C.

The gases from the cooler 4 or from the sulphur collector 5 after removal of the elemental sulphur contain as much as 5–20% of the total gaseous sulphur compounds originally introduced into the system, in the form of sulphur dioxide, carbon oxysulfide and hydrogen sulfide. As stated above the amount of reducing gases entering the combustion chamber 2 or the first catalyst chamber 3 may be slightly in excess of the proportion required to react with the reducible gases, (i. e. sulphur dioxide, oxygen, etc.). Accordingly there may be a slight excess of reducing gas in the outlet from the chamber 3. We have found that at the temperatures normally employed in the combustion chamber and the first (hot) catalyst chamber 3, hydrogen sulfide is the last reducing agent to be oxidized when a mixture of carbon monoxide, carbon dioxide, hydrogen, methane, unsaturated hydrocarbons, and hydrogen sulfide is used to reduce sulphur dioxide. This is probably due to the fact that there is an increasing tendency to form hydrogen sulfide from sulphur vapor, hydrogen, and the hydrocarbons as the amount of sulphur vapor increases during the progress of the reaction, according to the typical equation $H_2+S \rightarrow H_2S$, and also to the fact that the reaction $$3S + 2H_2O \rightarrow 2H_2S + SO_2$$

becomes more pronounced with increasing temperature, the sulphur dioxide being immediately reduced by any carbon monoxide present to form elemental sulphur while the carbon monoxide which has been affected by this reaction is oxidized to form the stable carbon dioxide. In any event under proper regulation the reducing gas in the gas mixture coming from the hot catalyst chamber will consist largely of hydrogen sulfide. This constituent together with any sulphur dioxide and carbon oxysulfide which may be present in the mixture, if discharged to the atmosphere would create a nuisance to the surrounding community and would result in a comparatively large loss in sulphur.

According to our invention, therefore, the gases coming from the cooler 4, with or without the removal by a suitable collector of any condensed sulphur carried along in the gas stream, are introduced into a second catalyst chamber 6, maintained at a temperature of about 125–200° C. and designated as the "cold catalyst." When the gas mixture contains an excess of reducing gas, an oxidizing gas such as sulphur dioxide, oxygen or air is added thereto. The amount of oxidizing gas admitted depends upon the amount of hydrogen sulfide, carbon oxysulfide and sulphur dioxide already present in the gas mixture. In case sulphur dioxide is added the amount will be so regulated by the valve 12 as to provide substantially interacting proportions of hydrogen sulfide, carbon oxysulfide and sulphur dioxide in the resulting mixture to yield elemental sulphur. However, according to our preferred method, oxygen or air will be added as the oxidizing gas and the amount of such air or oxygen will be regulated by the valve 11 so at least that amount necessary to oxidize all of the hydrogen sulfide and carbon oxysulfide to elemental sulphur will be added and preferably an excess of air or oxygen will be provided to insure complete oxidation.

In the second catalyst chamber 6 is a suitable substance capable of catalyzing the interaction of hydrogen sulfide and carbon oxysulfide with sulphur dioxide or air at comparatively low temperatures. We have found that most satisfactory results may be obtained when employing a catalyst as described and claimed in our co-pending U. S. application, Serial No. 119,739, dated June 30, 1926, known as "activated" bauxite. Such "activated" bauxite may be prepared by slowly heating the natural mineral bauxite to a temperature of 400–500° C. and maintaining such temperature for several hours to cause substantial dehydration. The dehydration may be carried out in vacuo if desired. This catalyst causes the oxidation of hydrogen sulfide by sulphur dioxide or oxygen at ordinary temperatures and the reaction is very rapid and complete at about 125–200° C. Likewise any carbon oxysulfide is readily decomposed by the sulphur dioxide or oxygen in the presence of a small amount of water vapor to yield carbon dioxide and sulphur. The temperature of the cold catalyst chamber 6 is always maintained below that at which sulphur has an appreciable vapor pressure, i. e. below about 200° C. According to our preferred method we maintain the temperature of this catalyst chamber at about 130–175° C. Ordinarily the heat evolved by the reactions in the cold catalyst chamber will be sufficient to maintain this temperature. However, if the quantity of interacting sulphur compounds should be too small for this, additional heat may be supplied by any suitable means.

The sulphur produced in the cold catalyst chamber 6 condenses on the catalytic material. The retained sulphur may be removed at intervals, whenever the activity of the catalyst becomes substantially decreased, by volatilizing it by means of external heat or by a stream of hot inert gas passed through the chamber and later condensing it, or it may be extracted by suitable solvents such as carbon disulfide. In any case the activity of the catalyst is renewed and it may be used again.

Other solid catalysts may be used in the cold catalyst chamber 6 such as activated carbon or silica gel, since these substances act to catalyze the oxidation of hydrogen sulfide with sulphur dioxide and oxygen or air at comparatively low temperatures. Likewise liquid catalysts such as tar oils, solutions of salts of the heavy metals, etc., may be employed. These substances serve not only to catalyze the oxidation of hydrogen sulfide to elemental sulphur but also act as sulphur collectors to condense and retain the sulphur thus produced.

The gases leaving the low temperature catalyst chamber are substantially free from all sulphur either in the elemental form or as compounds, and may be passed directly to the stack. However, to protect against any irregularity in operation or variations in the amount of sulphur dioxide in the gas entering the system, which might cause a presence of hydrogen sulfide or sulphur dioxide in the exit gas, a suitable absorber 7 may be provided which serves to absorb any residual sulphur dioxide or hydrogen sulfide, thereby preventing its escape, the absorbed gas being subsequently recovered and returned to the system. When employing activated bauxite as the cold catalyst the absorber may be dispensed with since the activated bauxite itself functions to adsorb large amounts of hydrogen sulfide or sulphur dioxide. Suitable absorbing materials are activated carbon, silica gel, or tar oils. The use of the absorber is, however, not necessary to the successful operation of the process and may be employed or not as desired.

While we have described the features of our invention with particular reference to the diagrammatic drawing, our invention is not limited to that particular arrangement of parts and the essential features of our invention may be summarized as follows:

1. Causing the reduction of a gas contained sulphur dioxide with solid reducing fuel such as carbonaceous fuel, or with a mixture of carbonaceous fuel and sulfide ore and subsequently causing interaction of the reducing gaseous products with reducible gases such as sulphur dioxide, or directly causing interaction of sulphur dioxide with a reducing gas such as coal gas, producer gas, water gas, hydrogen sulfide, etc., or with mixtures thereof, at a temperature above that at which the elemental sulphur produced will be precipitated, i. e. above about 300° C.

2. Cooling the resulting gas mixture.

3. Causing the oxidation of any hydrogen sulfide remaining in the gas mixture by means of sulphur dioxide, air or oxygen in the presence of a suitable catalysts such as activated bauxite or activated carbon at temperatures below those at which sulphur has an appreciable vapor pressure, i. e. about 200° C.

The process may be carried out at normal or increased pressures. In the latter case the entire system is maintained under positive pressure, i. e. of the order of several atmospheres.

Various changes and modifications may be made in the manner of applying our invention without departing from the spirit thereof and we do not wish to limit the scope thereof except as defined in the appended claims.

We claim:

1. A process of producing elemental sulphur which comprises the steps of causing the interaction of a gas containing sulphur dioxide with reducing fuel at a temperature above that at which the elemental sulphur formed will be precipitated, cooling the resulting gas mixture, and contacting the cooled gas with a catalyst capable of causing the interaction of hydrogen sulfide with an oxidizing gas while maintaining the temperature of said catalyst below that at which sulphur has an appreciable vapor pressure.

2. A process of producing elemental sulphur which comprises the steps of causing the interaction of a gas containing sulphur dioxide with reducing fuel above 300° C., cooling the resulting gas mixture, and contacting the cooled gas with a catalyst capable of causing the interaction of hydrogen sulfide with an oxidizing gas while maintaining the temperature of said catalyst below 200° C.

3. A process of producing elemental sulphur which comprises the steps of causing the interaction of a gas containing sulphur dioxide with carbonaceous reducing fuel at a temperature above that at which the elemental sulphur formed will be precipitated, cooling the resulting gas mixture, and contacting the cooled gas with a catalyst capable of causing the interaction of hydrogen sulfide with an oxidizing gas while maintaining the temperature of said catalyst below that at which sulphur has an appreciable vapor pressure.

4. A process of producing elemental sulphur which comprises the steps of causing the interaction of a gas containing sulphur dioxide with carbonaceous reducing fuel above 300° C., cooling the resulting gas mixture, and contacting the cooled gas with a catalyst capable of causing the interaction of hydrogen sulfide with an oxidizing gas while maintaining the temperature of said catalyst below 200° C.

5. A process of producing elemental sulphur which comprises the steps of causing the interaction of a gas containing sulphur dioxide with carbonaceous reducing fuel at a temperature above that at which the elemental sulphur formed will be precipitated, cooling the resulting gas mixture to condense the elemental sulphur, removing the condensed sulphur from the gas stream, and contacting the cooled gas with a catalyst capable of causing the interaction of hydrogen sulfide with an oxidizing gas while maintaining the temperature of said catalyst below that at which sulphur has an appreciable vapor pressure.

6. A process of producing elemental sulphur which comprises the steps of causing the interaction of a gas containing sulphur dioxide with carbonaceous reducing fuel above 300° C., cooling the resulting gas mixture to condense the elemental sulphur formed, removing the condensed sulphur from the gas stream, and contacting the cooled gas with a catalyst capable of causing the interaction of hydrogen sulfide with an oxidizing gas while maintaining the temperature of said catalyst below 200° C.

7. A process of producing elemental sulphur which comprises the steps of contacting a mixture of sulphur dioxide and reducing gases with a suitable catalyst at a temperature above that at which the elemental sulphur produced will be retained by said catalyst, cooling the resulting gas mixture, and contacting said cooled gas with a second catalyst capable of causing the interaction of hydrogen sulfide with an oxidizing gas while maintaining the temperature of the said second catalyst below that at which sulphur has an appreciable vapor pressure.

8. A process of producing elemental sulphur which comprises the steps of contacting a mixture of sulphur dioxide and reducing gases with a suitable catalyst at a temperature above 300° C., cooling the resulting gas mixture, and contacting said cooled gas with a second catalyst capable of causing the interaction of hydrogen sulfide with an oxidizing gas while maintaining the temperature of said second catalyst below 200° C.

9. A process of producing elemental sulphur which comprises the steps of contacting a mixture of sulphur dioxide and reducing gases with bauxite at a temperature above 300° C., cooling the resulting gas mixture, and contacting said cooled gas with activated bauxite while maintaining the temperature below 200° C.

10. A process of producing elemental sulphur which comprises the steps of mixing a sulphur dioxide-containing gas with reducing gases in proportions such that there is an excess of reducing gases over reducible gases, contacting said mixture with a suitable catalyst at a temperature above that at which the elemental sulphur produced will be retained by said catalyst, cooling the resulting products to condense and separate out the elemental sulphur formed, adding an oxidizing gas to said mixture to provide an excess of reducible gas over reducing gas and contacting the resulting mixture with a suitable catalyst capable of causing the oxidation of hydrogen sulfide with the oxidizing gas at a temperature below that at which sulphur has an appreciable vapor pressure.

11. A process of producing elemental sulphur which comprises mixing a sulphur dioxide-containing gas with reducing gases in proportions such that there is a slight excess of reducing gases over reducible gases, contacting said mixture with bauxite at a temperature above 300° C., cooling the resulting products to condense and separate out the elemental sulphur formed, adding an oxidizing gas to said mixture to provide an excess of reducible gas to reducing gas and contacting the resulting mixture with activated bauxite while maintaining a temperature below 200° C.

12. A process of producing elemental sulphur which comprises the steps of contacting a mixture of sulphur dioxide and reducing gases with a suitable catalyst at a temperature above 300° C., cooling the resulting gas mixture, contacting said cooled gas with a second catalyst capable of causing the interaction of hydrogen sulfide with an oxidizing gas while maintaining the temperature of said second catalyst below 200° C., and absorbing any residual hydrogen sulfide or sulphur dioxide.

13. A process of producing elemental sulphur which comprises the steps of mixing a sulphur dioxide containing gas with reducing gases in proportions such that there is a slight excess of reducing gases over reducible gases, contacting said mixture with a suitable catalyst at a temperature above that at which the elemental sulphur produced will be retained by said catalyst, cooling the resulting products, adding air to said cooled gas in sufficient amount to oxidize any hydrogen sulfide present, and contacting the resulting mixture with a suitable catalyst capable of causing the interaction of hydrogen sulfide with oxygen at a temperature below that at which sulphur has an appreciable vapor pressure.

14. A process of producing elemental sulphur which comprises the steps of mixing a sulphur dioxide containing gas with reducing gases in proportions such that there is a slight excess of reducing gases over reducible gases, contacting said mixture with bauxite at a temperature above 300° C., cooling the resulting products to condense and separate out the elemental sulphur formed, adding air to said cooled gas in sufficient amount to oxidize any hydrogen sulfide present, and contacting the resulting mixture with activated bauxite at a temperature below 200° C.

15. The process of producing elemental sulphur which comprises the steps of contacting a gas containing sulphur dioxide with incandescent carbonaceous fuel, adding sulphur dioxide to the gaseous products to provide approximately reacting proportions of reducing and reducible gases, contacting said mixture with a suitable catalyst to cause the interaction of said reducing and reducible gases, at a temperature above that at which the elemental sulphur produced will be retained by said catalyst, cooling the gas mixture to condense the elemental sulphur formed, and contacting said mixture at a temperature below that at which sulphur has an appreciable vapor pressure with a suitable catalyst to complete the interaction of the reducing and reducible gases to produce elemental sulphur.

16. The process of producing elemental sulphur which comprises the steps of contacting a gas containing sulphur dioxide with an incandescent carbonaceous fuel, adding sulphur dioxide to the gaseous products to provide approximately reacting proportions of reducing and reducible gases, contacting said mixture with a suitable catalyst to cause the interaction of said reducing and reducible gases at a temperature above that at which the elemental sulphur produced will be retained by said catalyst, cooling the gas mixture to condense the elemental sulphur formed, removing a major portion of the condensed sulphur from the gas stream present, and contacting said mixture at a temperature below that at which sulphur has an appreciable vapor pressure with a suitable catalyst to complete the interaction of the reducing and reducible gases to produce elemental sulphur.

17. The process of producing elemental sulphur which comprises the steps of contacting a gas containing sulphur dioxide with incandescent carbonaceous fuel, adding sulphur dioxide to the gaseous products to provide approximately reacting proportions of reducing and reducible gases, contacting said mixture at a temperature above 300° C. with bauxite to cause the interaction of said reducing and reducible gases, cooling the gas mixture to condense the elemental sulphur formed, removing the major portion of the condensed sulphur, adding an oxidizing gas to the resulting gas mixture to provide at least sufficient reducible gas to oxidize any hydrogen sulfide and carbon oxysulfide present, and contacting said mixture with activated bauxite to complete the interaction of reducing and reducible gases to produce elemental sulphur while maintaining the temperature below 200° C.

18. The process of producing elemental sulphur which comprises the steps of contacting a gas containing sulphur dioxide with an incandescent carbonaceous fuel, adding sulphur dioxide to the gaseous products to provide approximately reacting proportions of reducing and reducible gases, maintaining the temperature sufficiently high to burn any solid carbonaceous matter with carbon dioxide or sulphur dioxide, contacting said mixture with a suitable catalyst to cause the interaction of said reducing and reducible gases at a temperature above that at which the elemental sulphur produced will be retained by said catalyst, cooling the gas mixture to condense the elemental sulphur formed, adding an oxidizing gas to the resulting gas mixture to provide at least sufficient reducible gas to oxidize any hydrogen sulfide and carbon oxysulfide present, and contacting said mixture at a temperature below that at which sulphur has an appreciable vapor pressure with a suitable catalyst to complete the interaction of the reducing and reducible gases to produce elemental sulphur.

19. The process of producing elemental sulphur which comprises the steps of contacting a gas containing sulphur dioxide with incandescent carbonaceous fuel, adding sulphur dioxide to the gaseous products to provide approximately reacting proportions of reducing and reducible gases, maintaining the temperature sufficiently high to burn any solid carbonaceous matter with carbon dioxide or sulphur dioxide, contacting said mixture at a temperature above 300° C. with bauxite to cause the interaction of said reducing and reducible gases, cooling the gas mixture to condense the elemental sulphur formed, adding an oxidizing gas to the resulting gas mixture to provide at least sufficient reducible gas to oxidize any hydrogen sulfide and carbon oxysulfide present, and contacting said mixture with activated bauxite to complete the interaction of reducing and reducible gases to produce elemental sulphur while maintaining the temperature below 200° C.

20. The process of producing elemental sulphur which comprises the steps of contacting a gas containing sulphur dioxide with an incandescent carbonaceous fuel, adding sulphur dioxide to the gaseous products to provide approximately reacting proportions of reducing and reducible gases, the amount of reducing gas being in slight excess, contacting said mixture at a temperature above 300° C. with a suitable catalyst to cause the interaction of said reducing and reducible gases, cooling the gas mixture to condense the elemental sulphur formed, adding an oxidizing gas to the resulting gas mixture to provide at least sufficient reducible gas to oxidize any hydrogen sulfide present, contacting said mixture at a temperature below that at which sulphur has an appreciable vapor pressure with a suitable catalyst to complete the interaction of the reducing and reducible gases to produce elemental sulphur, and absorbing any residual hydrogen sulfide or sulphur dioxide.

21. The process of producing elemental sulphur which comprises the steps of contacting a gas containing sulphur dioxide, with an incandescent carbonaceous fuel, adding sulphur dioxide to the gaseous products to provide approximately reacting proportions of reducing and reducible gases, maintaining the temperature sufficiently high to burn any solid carbonaceous matter with carbon dioxide or sulphur dioxide contacting said mixture with a suitable catalyst to cause the interaction of said reducing and reducible gases at a temperature above that at which the elemental sulphur produced will be retained by said catalyst, cooling the gas mixture to condense the elemental sulphur formed, removing a major portion of the condensed sulphur from the gas stream, and contacting the remaining gas at a temperature below that at which sulphur has an appreciable vapor pressure with a suitable catalyst to complete the interaction of the reducing and reducible gases to produce elemental sulphur.

22. The process of producing elemental sulphur which comprises the steps of causing the interaction of a gas containing sulphur dioxide with reducing fuel at a temperature above that at which the elemental sulphur formed will be precipitated, cooling the resulting gas mixture to condense a substantial proportion of the elemental sulphur formed, removing the condensed sulphur from the gas stream, and then contacting the gas while at a temperature below 200° C. with a catalyst capable of causing the interaction of hydrogen and sulfide with an oxidizing gas.

In testimony whereof we affix our signatures.

RAYMOND C. BENNER.
ALFRED PAUL THOMPSON.